Aug. 1, 1950     L. W. T. CUMMINGS     2,517,525
CATALYTIC REACTION APPARATUS
Filed Oct. 13, 1947     3 Sheets-Sheet 1

INVENTOR.
LELAND W. T. CUMMINGS
BY
ATTORNEYS

Aug. 1, 1950     L. W. T. CUMMINGS     2,517,525
CATALYTIC REACTION APPARATUS
Filed Oct. 13, 1947     3 Sheets-Sheet 3
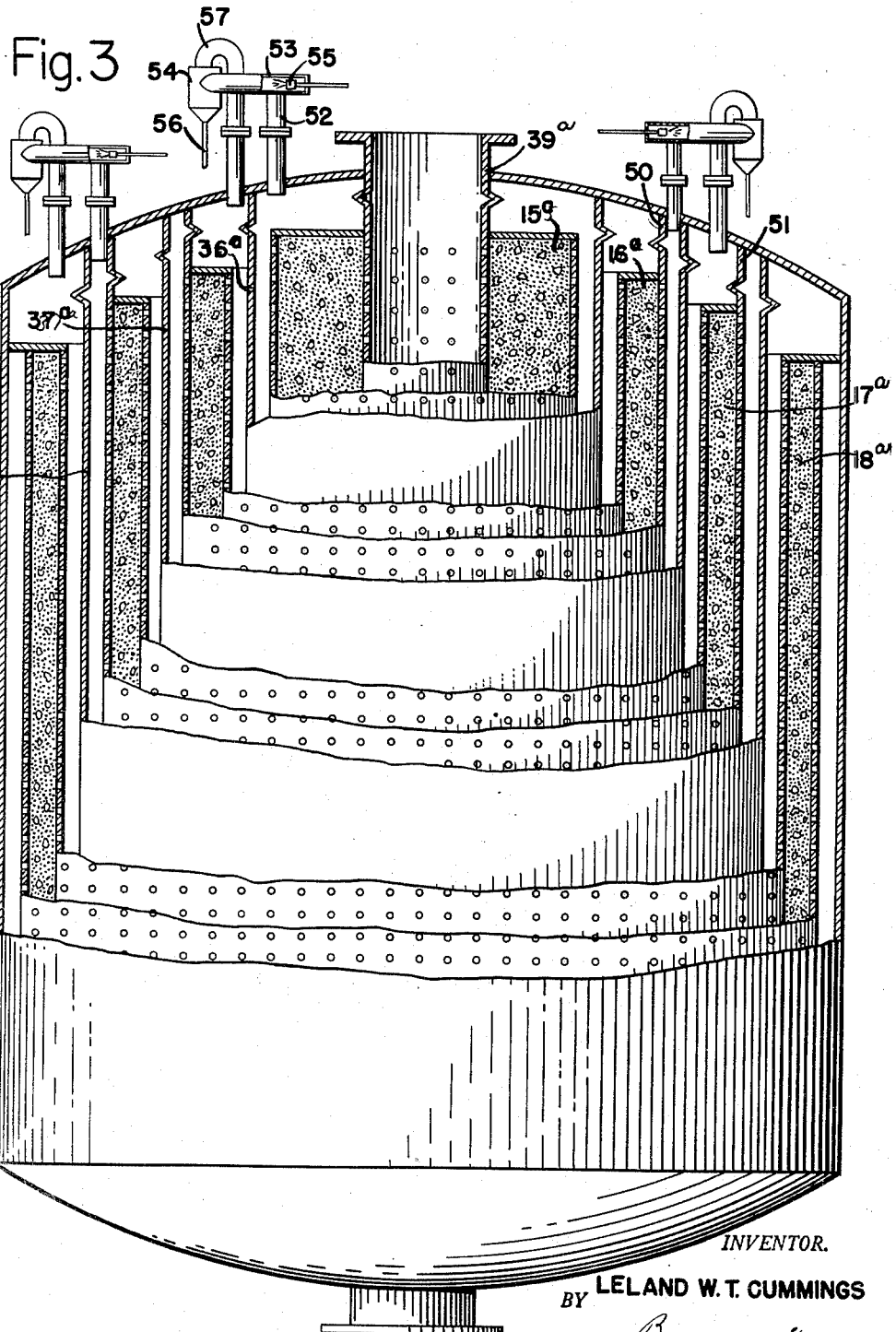
INVENTOR.
LELAND W. T. CUMMINGS
ATTORNEYS Patented Aug. 1, 1950

2,517,525

UNITED STATES PATENT OFFICE 2,517,525

CATALYTIC REACTION APPARATUS

Leland W. T. Cummings, Wyncote, Pa., assignor to Sun Oil Company, Philadelphia, Pa., a corporation of New Jersey Application October 13, 1947, Serial No. 779,559

16 Claims. (Cl. 23—288)

This invention relates to improved apparatus for conducting catalytic reactions and more particularly to apparatus for carrying out catalytic processes involving alternate endothermic and exothermic reactions. A typical process of this type is the catalytic conversion of hydrocarbons in a cyclic operation, wherein hydrocarbons are caused to react endothermically in the presence of a catalytic contact mass, causing deposition of carbonaceous deposits on the mass which reduce the catalytic activity, and the catalyst is then reactivated by burning off the carbonaceous material. The catalytic cracking of higher boiling hydrocarbons to lower boiling hydrocarbons is a specific example of this type of process. Other examples are reforming, dehydrogenation and the like.

More specifically, the present invention is concerned with an improved catalytic reactor for use in a stationary bed type of operation, wherein the catalyst is employed in the form of a plurality of stationary beds within the reactor and is regenerated periodically in situ by passing hot oxygen-containing gases through the several beds. The reactor is especially adapted for use in that type of catalytic conversion generally referred to in the art as adiabatic operation. By this is meant that both the endothermic and exothermic reactions are carried out without the use of a circulating convective fluid for supplying heat to, or removing heat from, the reaction zone by indirect heat transfer. In other words, in such adiabatic operation the heat required for the endothermic reaction is supplied either as sensible heat of the reactants entering the reaction zone or as heat stored in the contact mass during the previous regeneration period, while the heat evolved during the exothermic reaction either is stored in the contact mass for use in the subsequent on-stream period or else is removed from the reaction zone in the form of sensible heat of the effluent regeneration gases. The reaction apparatus according to the present invention is especially adapted for storage within the contact mass of a large proportion of the exothermic heat evolved during the regeneration period for use during the subsequent on-stream period. A feature of the invention permits the utilization of this stored heat not only as heat of reaction but also as heat for evaporating hydrocarbon charge material introduced between the several beds of catalytic contact mass.

The features and advantages of the invention can best be understood by reference to the accompanying drawings, in which:

Figure 3 is an elevational view, partly in section, of a modified form of reactor having external means for introducing additional reactants.

Figure 1:
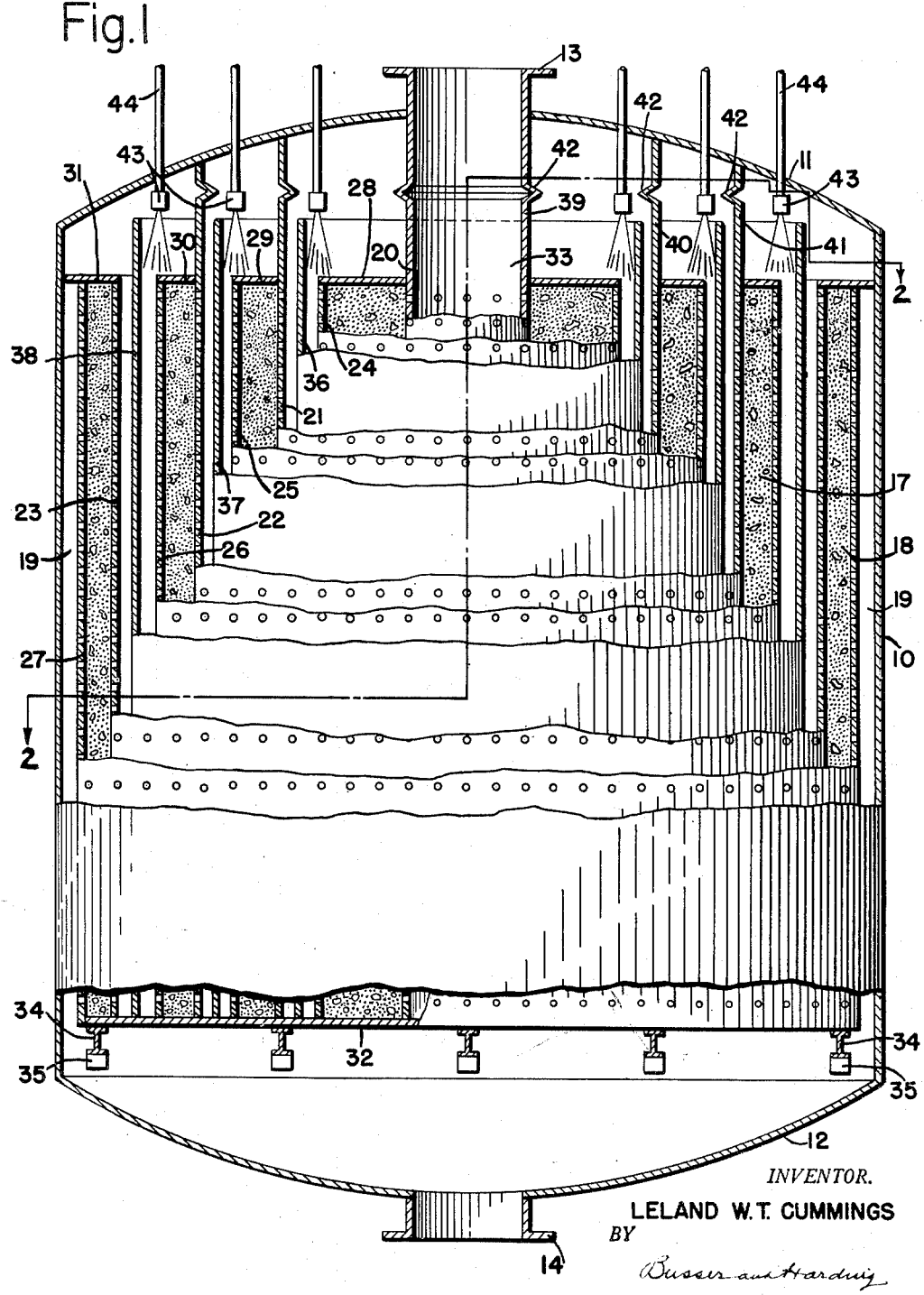
Figure 1 is a sectional elevation of one form of the improved catalytic reactor.
Figure 2:
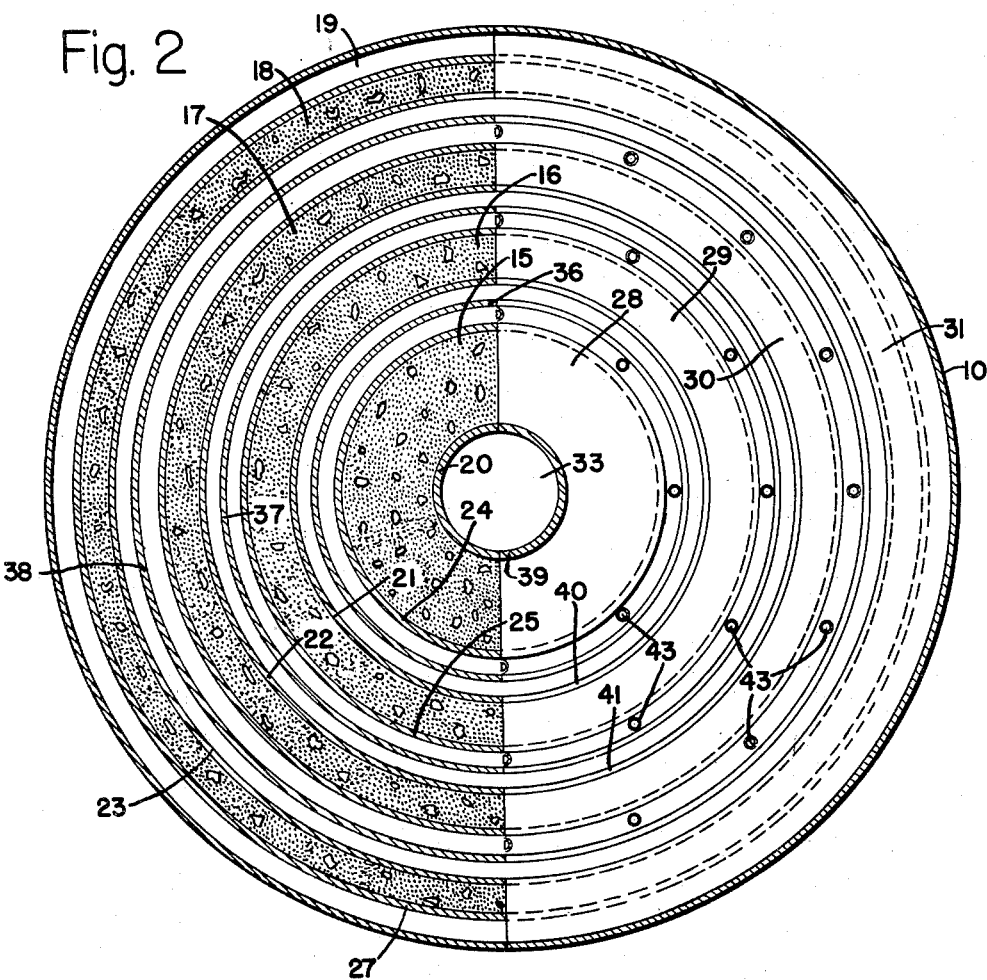
Figure 2 is a cross-sectional view of the reactor illustrated in Figure 1, taken at two different levels as indicated by the line 2—2 of Figure 1.

Referring to the drawings, Figures 1 and 2 show one form of the reaction apparatus in which the body of the reactor comprises a vertically cylindrical outer shell 10 having convex top and bottom end portions 11 and 12. An inlet connection or nozzle 13 is provided at the top for introducing vaporous reactants centrally within the reactor and an outlet connection 14 is provided at the bottom. Disposed concentrically within the reactor are a plurality of annular shaped trays which are each adapted to retain a bed of granular contact material. While for purpose of illustration four such trays or beds are shown, being designated as 15, 16, 17 and 18 from the innermost to the outermost bed respectively, it will be understood that any suitable or desired number may be provided. The trays are spaced apart radially thus providing an annular space between each pair of the same, and the outer tray 18 has an outer diameter less than the inner diameter of shell 10 so as to provide an outermost annular space 19 between tray 18 and the shell.

Each tray comprises outer and inner vertical walls which are continually perforated to permit flow of fluid therethrough. The inner perforate walls of trays 15, 16, 17 and 18 are designated respectively as 20, 21, 22 and 23, while the outer perforate walls are designated respectively as 24, 25, 26 and 27. Each tray has an imperforate circular top member covering the tray, these being illustrated in the drawings as 28, 29, 30 and 31 from the innermost to the outermost tray, respectively. Top member 31 on the outermost tray extends radially outward to outer shell 10 so as to close off the outermost annular space 19 at its top as shown in Figure 1, so that reaction products issuing from bed 18 into annular space 19 will flow downwardly and out of the reactor through nozzle 14. An imperforate circular bottom member or plate 32 extending radially to the outer perforate wall 27 of the outermost tray may be provided to function as the bottom portion for each of the trays. Plate 32 also serves to close off the bottom of each of the annular spaces between trays as well as the bottom of the central space 33 within the innermost tray so as to cause the reactants to flow through the reactor in the desired manner as hereinafter described. Plate 32 may rest upon a plurality of beams 34 which extend transversely across the reactor and which may be supported therein by means of support lugs 35 secured to outer shell 10 in any suitable manner.

Within each annular space between trays, there is provided a circular baffle which extends from the bottom plate 32 to at least the top of the trays and preferably substantially above the trays. These baffles, designated in Figures 1 and 2 as 36, 37 and 38, respectively, from the innermost to the outermost baffle, prevent reactants from flowing directly from one tray to the next and require the same to pass upwardly and into the space above the trays before flowing to the next one. Imperforate wall members 39, 40 and 41, which extend upwardly from the inner walls of the trays (except the outermost tray) to the top of the reactor and which are provided with expansion joints illustrated as 42, serve to define separate passageways above the trays for the flow of reactants from one tray to the next. Within each of these flow passageways, there are provided a plurality of spray nozzles 43, connected to inlet lines 44, for the introduction of liquid reactants into the vapor stream in the form of a fine spray.

The trays are filled with a granular contact material, which preferably is a mixture of catalyst (for example, a silica-alumina type catalyst if the reaction to be conducted is the cracking of hydrocarbons) and a granular inert material of high heat absorbing capacity (for example, artificially fused oxide such as described in Houdry Patent No. 2,414,812). The proportion of catalyst to heat absorbing material may vary widely depending upon the particular materials used and the amount of heat that it is desired to store in the contact mass during each cycle, but generally will be within the range of 1:5 to 3:1.

It is distinctly preferable that the perforate walls of the trays be so designed with respect to the number and size of perforations that the pressure drop across each wall during regeneration will be within the range of 0.2 to 1.0 lb./sq. in. and preferably of the order of 0.5 lb./sq. in. This will insure good distribution of regenerating gas flowing through the contact mass and will minimize by-passing in case of shrinkage of the contact mass within the tray. Such shrinkage has been found to occur almost invariably upon prolonged operation, and consequently it is of great importance that the inner and outer walls of the trays be properly orificed to give the desired pressure drop as above specified for the regeneration period. This will also insure satisfactory distribution of reactants during the on-stream period.

It is also distinctly preferable that the trays be of increasing volumetric capacity from the innermost to the outermost tray to compensate for the additional reactants introduced as spray between the beds so that the space velocities of reactants passing through the several beds will be about the same. It will be evident that the reactor could, if desired, be arranged so that the flow would be inwardly rather than outwardly; but in order to provide for having about the same space velocities through the several trays, it will be advantageous to design the reactor for flow from the inner to the outer tray, as described above, in order that the tray having the lowest volumetric capacity will be the one of smallest diameter.

In operation, during the on-stream or endothermic reaction period, hydrocarbon reactants are introduced through inlet nozzle 13 into the central space 33 and flow horizontally through the first bed of contact material into the annular space adjacent the bed. In passing through bed 15 the reactants will absorb heat from the contact material in excess of that necessary for the endothermic conversion reaction and accordingly the vapor issuing from bed 15 will be at a higher temperature than the reactants entering the bed. The temperature will also be higher at this point than desired for reaction in the next catalytic bed 16. This excess heat is utilized to vaporize the liquid reactants injected between the beds. Thus, the hot vapor from bed 15 flows upwardly along baffle 36 and into the zone in the upper part of the reactor, where it commingles with liquid spray introduced through nozzles 43. Vaporization of the liquid occurs and sufficient heat is thereby absorbed to reduce the temperature of the resulting vapor mixture to the desired value. The mixture then flows to and through bed 16 where heat is again picked up in excess of that necessary for maintaining the catalytic conversion reaction in the next bed. After passing through bed 16 the vapors commingle with the next liquid spray introduced through the spray nozzles positioned in the zone above the bed and the temperature is again reduced to the desired value before the mixture flows to bed 17. The hot vapors issuing from bed 17 likewise are mixed with sufficient liquid hydrocarbons introduced through the next set of spray nozzles to regulate the temperature of the mixture passing to bed 18 to the desired level. Hot reaction products issuing from the outermost bed pass from the reactor through annular space 19 and outlet nozzle 14.

By way of example, in the catalytic cracking of hydrocarbons the reactants flowing to bed 15 may have a temperature of say 800–900° F.; whereas the hydrocarbons issuing from bed 15 into the annular space adjacent thereto may have a temperature of 1000–1100° F. Sufficient liquid reactants, at a temperature of say 200–600° F., may be introduced as quenching material through the spray nozzles to cause the resulting vapor mixture passing to bed 16 to have a temperature of 800–900° F. Upon passing through bed 16, the mixture will absorb sufficient heat to reach a temperature again of 1000–1100° F. Similar fluctuations in temperature will occur as the reactants pass through the reactor and alternately come in contact with the spray streams and the other catalytic contact masses.

After the catalyst has become sufficiently inactivated due to deposition of carbonaceous material in the contact mass, the on-stream operation is stopped and the reactor is then purged with an inert gas (e. g. steam) or evacuated to remove oil vapors. The catalyst is then regenerated by blowing an oxygen-containing gas such as air through the beds to burn off the carbonaceous material. This may be done by passing the regenerating gas through the beds in series or by flowing separate streams of regenerating gas through the beds by means of suitable inlet and outlet connections (not shown). During the regeneration, heat is stored in the masses of contact material for utilization during the subsequent on-stream operation as heat of reaction and as heat for vaporizing the hydrocarbon liquids injected between beds.

Figure 3 shows a modified form of reactor in which the spray means for introducing the liquid reactants between beds are positioned outside of the reactor. The reactor is illustrated as containing four beds of catalytic contact material, shown as 15—a, 16—a, 17—a and 18—a; but in this case the beds are of varying height, decreasing from the innermost to the outermost bed, in order to permit better utilization of the space in the upper part of the reactor. The trays otherwise may be of essentially the same construction as described in connection with Figures 1 and 2. In the present modification, baffles 36—a, 37—a and 38—a positioned between the trays extend upwardly to the top of the reactor and imperforate wall members 39—a, 50 and 51 also extend from the top of the three innermost trays to the top of the reactor. Suitable expansion joints should, of course, be included to provide for expansion or contraction of these elements. This arrangement, together with an external passageway leading around each baffle, serves to direct the flow of vapors outside of the reactor in passing from one bed to the next.

Each of the external vapor passageways comprises a flanged outlet conduit 52 connecting with a spray chamber 53 and thence with a tangential separator 54. A spray nozzle 55 is positioned within the spray chamber for introduction of liquid reactants into the vapor stream in the form of a fine spray. Tangential separator 54 is provided with a bottom outlet line 56 for withdrawing any liquid which does not vaporize under the prevailing temperature and pressure conditions and with a vapor line 57 leading back to the reactor for introduction of the reaction mixture to the next catalyst bed. Advantageous features of this modification include the elimination of any contact between hot metal within the reactor and the relatively cold liquid spray, as well as the prevention of any spray material which fails to vaporize from passing to the next catalyst bed.

It will be understood that the drawings are merely illustrative of certain embodiments and that numerous specific modifications may be made without departing from the scope of the invention. For example, it is apparent that reactants could be introduced into the central space within the reactor from the bottom rather than the top and that the reaction products could be withdrawn from the top outlet. It is also evident that the reaction trays could be constructed as individual units so that each tray would rest upon bottom plate 32. Provision could be made for withdrawing such individual trays separately from the reactor by removal of its top portion. Various other modifications will be apparent to those skilled in the art.

Having described my invention, what I claim and desire to protect by Letters Patent is:

1. Catalytic reaction apparatus for conducting alternate endothermic and exothermic reactions which comprises a vertically cylindrical outer shell, a plurality of annular-shaped trays positioned concentrically within said shell in radially spaced apart relation to each other so as to provide an annular space between each two adjacent trays, each of said trays being adapted to retain therein a bed of granular contact material and comprising an inner perforate wall, an outer perforate wall, an imperforate top member and an imperforate bottom member, the outermost tray having an outer perforate wall of lesser diameter than said shell to provide an annular space therebetween, an imperforate end member extending across each annular space between trays at one end thereof, a partitioning member extending from the other end of each tray to said shell, said partitioning members forming boundaries of passageways adjacent said other end of the trays for flowing reactants from bed to bed, a cylindrical baffle in each annular space between beds extending vertically from said imperforate end member at least throughout the length of the annular space to prevent short-distance flow from bed to bed, spray nozzles positioned in said passageways for introduction of liquid reactants into the flowing stream in the form of a fine spray, fluid flow means communicating from without said shell to the space within the innermost tray and other fluid flow means communicating from without said shell to the outermost annular space.

2. Catalytic reaction apparatus for conducting alternate endothermic and exothermic reactions which comprises a vertically cylindrical outer shell, a plurality of annular-shaped trays positioned concentrically within said shell in radially spaced apart relation to each other so as to provide an annular space between each two adjacent trays and a central space within the innermost tray, each of said trays being adapted to retain therein a bed of granular contact material and comprising an inner perforate wall, an outer perforate wall and an imperforate top member, a circular imperforate bottom member extending across the bottom of said central space and radially outward to the outer wall of the outermost tray, said outermost tray having an outer perforate wall of lesser diameter than said shell to provide an annular space therebetween, a cylindrical baffle positioned in each annular space between beds and extending vertically from said imperforate circular bottom member at least to the upper end of the annular space so as to prevent short-distance flow from bed to bed, a partitioning member extending from the upper end of each tray to said shell, said partitioning members forming boundaries of passageways above the trays for flowing reactants from bed to bed, spray means including a plurality of spray nozzles positioned in each of said passageways for introduction of liquid reactants into the flowing stream in the form of a fine spray, means for introducing reactants into said central space and means for withdrawing reaction products from the outermost annular space.

3. Reaction apparatus which comprises a cylindrical outer shell, a plurality of annular shaped trays positioned concentrically within said shell in radially spaced apart relation and adapted each to retain a bed of contact material, the inner and outer walls of each tray being perforated to receive and discharge reaction fluids, channels for inflow and outflow of such fluids, the perforations in the inner wall of the innermost tray communicating with one channel and the perforations in the outer wall of the outermost tray communicating with the other channel, members closing the annular spaces between trays at one end thereof, cylindrical baffles extending from said members at least throughout the length of each annular space to prevent short-distance flow from bed to bed, partitioning members extending from the other end of said trays to said shell, said partitioning members forming boundaries of passageways adjacent said other end of the trays for flowing reaction fluids from bed to bed, and spray means positioned in said passageways for introduction of liquid reactant in the form of a fine spray.

4. Reaction apparatus which comprises a cylindrical outer shell, a plurality of annular shaped trays positioned concentrically within said shell in radially spaced apart relation and adapted each to retain a bed of contact material, the inner and outer walls of each tray being perforated to receive and discharge reaction fluids, channels for inflow and outflow of such fluids, the perforations in the inner wall of the innermost tray communicating with one channel and the perforations in the outer wall of the outermost tray communicating with the other channel, members closing the annular spaces between trays at one end thereof, cylindrical baffles extending from said members at least throughout the length of each annular space but terminating short of said shell to prevent short-distance flow from bed to bed, partitioning members extending from the other end of said trays to said shell, said partitioning members forming boundaries of passageways adjacent said other end of the trays for flowing reaction fluids from bed to bed, and spray means positioned in said passageways for introduction of liquid reactant in the form of a fine spray.

5. Reaction apparatus which comprises a cylindrical outer shell, a plurality of annular shaped trays positioned concentrically within said shell in radially spaced apart relation and adapted each to retain a bed of contact material, the inner and outer walls of each tray being perforated to receive and discharge reaction fluids, channels for inflow and outflow of such fluids, the perforations in the inner wall of the innermost tray communicating with one channel and the perforations in the outer wall of the outermost tray communicating with the other channel, members closing the annular spaces between trays at one end thereof, cylindrical baffles extending from said members throughout the length of each annular space and to said shell to prevent short-distance flow from bed to bed, partitioning members extending from the other end of said trays to said shell, said partitioning members forming with that portion of each adjacent cylindrical baffle which extends beyond the annular space a passageway for flowing reaction fluids from bed to bed, conduit means outside of said shell connecting each two adjacent passageways, and spray means positioned in said passageways for introduction of liquid reactant in the form of a fine spray.

6. Apparatus according to claim 5 wherein said conduit means includes a vapor-liquid separator at a locus downstream from said spray means, said separator having means for withdrawing separated liquid.

7. Apparatus according to claim 6 wherein said vapor-liquid separator is a tangential type separator.

8. Catalytic reaction apparatus for conducting alternate endothermic and exothermic reactions which comprises a vertically cylindrical outer shell, a plurality of annular-shaped trays positioned concentrically within said shell in radially spaced apart relation to each other so as to provide an annular space between each two adjacent trays, each of said trays being adapted to retain therein a bed of granular contact material and comprising an inner perforate wall, an outer perforate wall, an imperforate top member and an imperforate bottom member, the outermost tray having an outer perforate wall of lesser diameter than said shell to provide an annular space therebetween, an imperforate end member extending across each annular space between trays at one end thereof, a partitioning member extending from the other end of each tray to said shell, said partitioning members forming with each adjacent partitioning member a passageway for flowing reactants from bed to bed, a cylindrical baffle in each annular space between beds extending vertically from said imperforate end member at least throughout the length of the annular space but terminating short of said shell to prevent short-distance flow from bed to bed, spray means positioned in each of said passageways for introduction of liquid reactants into the flowing stream in the form of a fine spray, fluid flow means communicating from without said shell to the space within the innermost tray and other fluid flow means communicating from without said shell to the outermost annular space.

9. Catalytic reaction apparatus for conducting alternate endothermic and exothermic reactions which comprises a vertically cylindrical outer shell, a plurality of annular-shaped trays positioned concentrically within said shell in radially spaced apart relation to each other so as to provide an annular space between each two adjacent trays, each of said trays being adapted to retain therein a bed of granular contact material and comprising an inner perforate wall, an outer perforate wall, an imperforate top member and an imperforate bottom member, the outermost tray having an outer perforate wall of lesser diameter than said shell to provide an annular space therebetween, an imperforate end member extending across each annular space between trays at one end thereof, a partitioning member extending from the other end of each tray to said shell, a cylindrical baffle in each annular space between beds extended vertically from said imperforate end member throughout the length of the annular space and to said shell to prevent short-distance flow from bed to bed, said partitioning members forming with that portion of each adjacent cylindrical baffle which extends beyond the annular space a flow passageway, conduit means outside of said shell connecting each two adjacent flow passageways, spray means positioned in each of said conduit means for introduction of liquid reactants into the flowing stream in the form of a fine spray, fluid flow means communicating from without said shell to the space within the innermost tray and other fluid flow means communicating from without said shell to the outermost annular space.

10. Apparatus according to claim 9 wherein said conduit means includes a vapor-liquid separator at a locus downstream from said spray means, said separator having means for withdrawing separated liquid.

11. Apparatus according to claim 10 wherein said vapor-liquid separator is a tangential type separator.

12. Catalytic reaction apparatus for conducting alternate endothermic and exothermic reactions which comprises a vertically cylindrical outer shell, a plurality of annular-shaped trays positioned concentrically within said shell in radially spaced apart relation to each other so as to provide an annular space between each two adjacent trays and a central space within the innermost tray, each of said trays being adapted to retain therein a bed of granular contact material and comprising an inner perforate wall, an outer perforate wall and an imperforate top member, a circular imperforate bottom member extending across the bottom of said central space and radially outward to the outer wall of the outermost tray, said outermost tray having an outer perforate wall of lesser diameter than said shell to provide an annular space therebetween, a cylindrical baffle positioned in each annular space between beds and extending vertically from said imperforate circular bottom member to above the upper end of the annular space but terminating short of said shell to prevent short-distance flow from bed to bed, a partitioning member extending from the upper end of each tray to said shell, said partitioning member forming with each adjacent partititoning member a flow passageway around each baffle at its upper end, spray means including a plurality of spray nozzles positioned in each of said passageways for introduction of liquid reactants into the flowing stream in the form of a fine spray, means for introducing reactants into said central space and means for withdrawing reaction products from the outermost annular space.

13. Catalytic reaction apparatus for conducting alternate endothermic and exothermic reactions which comprises a vertically cylindrical outer shell, a plurality of annular shaped trays positioned concentrically within said shell in radially spaced apart relation to each other so as to provide an annular space between each two adjacent trays and a central space within the innermost tray, each of said trays being adapted to retain therein a bed of granular contact material and comprising an inner perforate wall, an outer perforate wall and an imperforate top member, a circular imperforate bottom member extending across the bottom of said central space and radially outward to the outer wall of the outermost tray, said outermost tray having an outer perforate wall of lesser diameter than said shell to provide an annular space therebetween, a cylindrical baffle positioned in each annular space between beds and extending vertically from said imperforate circular bottom member throughout the length of the annular space and to said shell to prevent short-distance flow from bed to bed, a partitioning member extending from the upper end of each tray to said shell, said partitioning members forming with that portion of each adjacent cylindrical baffle which extends above the annular space a flow passageway, conduit means outside of said shell connecting each two adjacent flow passageways, spray means including a plurality of spray nozzles positioned in each of said conduit means for introduction of liquid reactants into the flowing stream in the form of a fine spray, means for introducing reactants into said central space and means for withdrawing reaction products from the outermost annular space.

14. Apparatus according to claim 13 wherein said conduit means includes a vapor-liquid separator at a locus down-stream from said spray means, said separator having means for withdrawing separated liquid.

15. Apparatus according to claim 14 wherein said vapor-liquid separator is a tangential type separator.

16. Reaction apparatus which comprises a cylindrical outer shell, a plurality of annular shaped trays positioned concentrically within said shell in radially spaced apart relation and adapted each to retain a bed of contact material, the end walls of all said trays being closed and corresponding end walls of the trays being spaced from the adjacent end wall of the shell, the inner and outer walls of each tray being perforated to receive and discharge reaction fluids, channels for inflow and outflow of such fluids, the perforations in the inner wall of the innermost tray communicating with one channel and the perforations in the outer wall of the outermost tray communicating with the other channel, partitioning members extending from the last-named end walls of the several trays toward the adjacent end wall of the shell and forming between them spaces for flow of reactant from bed to bed and preventing direct fluid flow between said spaces, cylindrical baffles extending between, and at least throughout the length of, said trays to prevent short distance fluid flow from bed to bed but allowing fluid flow from bed to bed at loci beyond the end walls of the trays that are spaced from the adjacent end wall of the shell as hereinbefore specified, and spray means communicating with the spaces between partitions for introduction of liquid reactant in the form of a fine spray into reactant flowing from bed to bed.

LELAND W. T. CUMMINGS.

REFERENCES CITED

The following references are of record in the file of this patent:

UNITED STATES PATENTS

| Number | Name | Date |
| --- | --- | --- |
| 1,970,923 | Spalding | Aug. 21, 1934 |
| 2,450,804 | Loy | Oct. 5, 1948 |